US012592579B2

(12) United States Patent
Yuan et al.

(10) Patent No.: US 12,592,579 B2
(45) Date of Patent: Mar. 31, 2026

(54) POWER DISTRIBUTION DEVICE AND POWER DISTRIBUTION SYSTEM

(71) Applicant: Schneider Electric (China) Co., Ltd., Beijing (CN)

(72) Inventors: Xu Yuan, Shanghai (CN); Jiamin Chen, Shanghai (CN); Ying Shi, Shanghai (CN); Xiaochun Gao, Shanghai (CN); Haijun Zhao, Shanghai (CN); Wen Gu, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 43 days.

(21) Appl. No.: 18/520,310

(22) Filed: Nov. 27, 2023

(65) Prior Publication Data

US 2024/0380237 A1     Nov. 14, 2024

(30) Foreign Application Priority Data

May 10, 2023     (CN) .......................... 202310525157.5

(51) Int. Cl.
 *H02J 9/06*          (2006.01)
(52) U.S. Cl.
 CPC ..................................... *H02J 9/06* (2013.01)

(58) Field of Classification Search
 CPC .......... H02J 9/06; H02J 2310/16; H02J 1/084; H02J 9/061; H02J 9/068; H02J 1/10; G06F 1/30
 See application file for complete search history.

(56) References Cited

U.S. PATENT DOCUMENTS

| | | | |
|---|---|---|---|
| 2011/0187197 A1 | 8/2011 | Moth | |
| 2016/0181861 A1 | 6/2016 | Familiant et al. | |
| 2019/0350105 A1* | 11/2019 | Belady .................... | H02J 9/061 |
| 2023/0275438 A1* | 8/2023 | Lytle ...................... | H02J 3/466 |
| | | | 700/291 |

* cited by examiner

*Primary Examiner* — Daniel Cavallari
(74) *Attorney, Agent, or Firm* — Quinn IP Law

(57)          ABSTRACT

A power distribution device is disclosed. The power distribution device includes: a first power source input end for connecting a first power source; a second power source input end for connecting a second power source; a first power source switch for connecting a first power source input end with a bus and switching on and off the power supply of the first power source; a second power source switch for connecting a second power source input end with a bus and switching on and off the power supply of the second power source; the bus for connecting with a load device and supplying power for the load device; and a load device switch for switching on and off the power supply to a relevant load device. Furthermore, A power distribution system is also disclosed.

9 Claims, 3 Drawing Sheets

POWER DISTRIBUTION DEVICE AND POWER DISTRIBUTION SYSTEM

TECHNICAL FIELD

The present disclosure relates to a power distribution device and a power distribution system.

BACKGROUND

There are a large number of network switches and server clusters arranged in the data center. Thus, the data center is the core of the information network, and it is also the data aggregation center of the information network system. The data center needs to operate 24 hours a day without interruption, thus the power supply of the data center is not allowed to be interrupted. To supply power to the data center, a stable and reliable power supply and distribution system for the data center needed to be built. In the existing technologies, the power supply and distribution system of the data center includes a high-voltage transformer and distributor, which serves as a main power source to provide electric energy for the data center; a generator, which is used as a backup power source to supply power to the data center when there is a power outage; a transfer switch capable of completing the switching between the main power source and the backup power source; UPS (Uninterruptible Power Source), through which can provide qualified and backup electric energy for the data center; and column head cabinets and rack power distribution devices, which are used for distributing electric energy to different devices in the data center.

With the development of new energy and access to DC power sources, the existing data center power supply and distribution system cannot be compatible with AC power supply and DC power supply through simple transformation. Thus, it is necessary to find a new scheme to provide an interface for the power supply of new energy.

Meanwhile, under the increasingly urgent demand for low-carbon and green development, the IT load of the data center becomes an ideal design goal to absorb green energy most directly. However, due to the intermittence, diversity and distribution of green energy in the region, the new energy access of traditional data centers is usually accessed through the rooftop photovoltaics uniformly through the inverters at the low-voltage AC distribution. However, this design usually does not directly supply IT load, and it will also interrupt the supply of green energy when the main power is lost.

SUMMARY

The present disclosure proposes a power distribution device which can be compatible with different power source types and has lower power consumption and smaller volume.

The present disclosure proposes a power distribution device, the power distribution device includes: a first power source input end for connecting a first power source; a second power source input end for connecting a second power source; a first power source switch for connecting a first power source input end with a bus and switching on and off the power supply of the first power source; a second power source switch for connecting the second power source input end with a bus and switching on and off the power supply of the second power source; the bus for connecting with a load device and supplying power for the load device;

and a load device switch for switching on and off the power supply to the relevant load device.

In an embodiment according to the present disclosure, the power distribution device further includes: a first detection unit for detecting the electrical parameters of a first power source; a second detection unit for detecting the electrical parameters of a second power source; and a control unit for determining whether the first power source fails according to the electrical parameters of the first power source; for determining whether the second power source fails according to the electrical parameters of the second power source, wherein the control unit controls the first power source switch to be switched on, and under the condition that the first power source fails, the control unit controls a first power source switch to be switched off and simultaneously controls a second power source switch to be switched on.

In an embodiment according to the present disclosure, the power distribution device further includes: a load detection unit for detecting the electrical parameters of a load device, wherein the control unit determines whether a fault occurs at the load device according to the electrical parameters of the load device, and under the condition that the first power source switch is switched on, the control unit controls the first power source switch to be switched off and then switched on under the condition that the load device fails, and controls the load device switch to be switched off in a time period between the switching off and the switching on of the first power source switch, or under the condition that the second power source switch is switched on, the control unit controls the second power source switch to be switched off first and then switched on under the condition the load device fails, and controls the load device switch to be switched off in a time period between the switching off and the switching on of the second power source switch.

In an embodiment according to the present disclosure, the first power source is an AC power source and operates as a main power source, and the second power source is a DC power source and operates as a backup power source, or the first power source is a DC power source and operates as a main power source, and the second power source is an AC power source and operates as a backup power source, or the first power source and the second power source are both AC power sources or both DC power sources.

In an embodiment according to the present disclosure, a DC power source includes a plurality of sub-DC power source connected in parallel to a DC bus, and the sub-DC power source includes photovoltaic devices, energy storage batteries, fuel cells, and converter power sources connected to an AC power grid or a turbine device.

In an embodiment according to the present disclosure, the first power source switch and the second power source switch are designed as fast on-off switches, and the on-time and off-time of the fast on-off switches are less than 10 ms.

In an embodiment according to the present disclosure, the first power source switch and the second power source switch are designed as solid-state switches, and the load device switch is designed as a thyristor.

In an embodiment according to the present disclosure, the electrical parameters include voltage, current and frequency.

The present disclosure also provides a power distribution system, which includes: one or more of the above power distribution devices; uninterruptible power source connected to a first power source input end of the power distribution device; a DC power source connected to a second power source input end of the power distribution device and comprising a plurality of sub-DC power sources connected in parallel to a DC bus, wherein under the condition that the voltage on a DC bus of the DC power source is higher than a preset switching threshold the second, a power source switch of the power distribution device is switched on.

In an embodiment according to the present disclosure, under the condition that there are multiple power distribution devices, different switching thresholds are preset respectively for the power distribution devices, and under the condition that the voltage on the DC bus of a DC power source is higher than a relevant switching threshold, a second power source switch of a relevant power distribution device is switched on.

In an embodiment according to the present disclosure, the sub-DC power source includes photovoltaic devices, energy storage batteries, fuel cells, and converter power sources connected to an AC power grid or a turbine device.

The power distribution device and power distribution system according to the embodiments of the present disclosure can be compatible with AC power sources and DC power sources, thus the power distribution device can adapt to the diversification of current power source types, and can realize the most direct green absorption of selected loads, thereby realizing the maximum utilization of green energy within the data center and simultaneously guaranteeing high-reliability power supply. Compared with the traditional power distribution cabinets or column head cabinets, an automatic transfer switch (ATS) or a static transfer switch (STS) for switching power sources is omitted in the power distribution device according to the present disclosure, the volume of the power distribution device can be reduced. Furthermore, the power distribution device based on solid-state switches can realize switching, protection and measurement between power sources more efficiently and quickly, and has lower power consumption. The power distribution device based on solid-state switches thus has higher integration and thus can have smaller volume.

BRIEF DESCRIPTION OF DRAWINGS

In order to explain the technical schemes of the embodiments of the present disclosure more clearly, the drawings needed in the description of the embodiments will be briefly introduced below. The drawings in the following description are only exemplary embodiments of the present disclosure.

DETAILED DESCRIPTION

Figure 1:
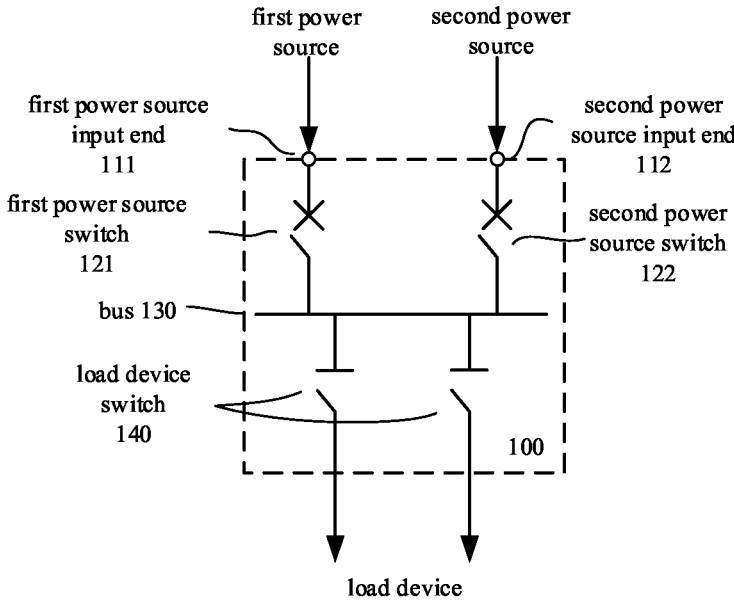
FIG. 1 illustrates a schematic circuit diagram of a power distribution device according to an embodiment of the present disclosure.

To make the purposes, technical schemes and advantages of the present disclosure more obvious, example embodiments according to the present disclosure will be described in detail below regarding the accompanying drawings. Obviously, the described embodiment is only a portion of the embodiments of the present disclosure, not all the embodiments of this disclosure, and it should be understood that the present disclosure is not limited by the example embodiments described here.

In the present specification and the drawings, basically, the same or similar steps and elements are denoted using the same or similar reference numerals, and repeated descriptions of these steps and elements will be omitted. Meanwhile, in the description of the present disclosure, the terms "first", "second" and so on are only used to distinguish descriptions, and cannot be understood as indicating or implying relative importance or ranking.

In the present specification and drawings, according to embodiments, elements are described in singular or plural forms. However, the singular and plural forms are appropriately selected for the proposed situation only for the convenience of explanation and are not intended to limit the present disclosure to this. Thus, the singular form can include the plural form, and the plural form can also include the singular form unless the context explicitly illustrates otherwise.

FIG. 1 illustrates a schematic circuit diagram of a power distribution device 100 according to an embodiment of the present disclosure. In the embodiment according to the present disclosure, the power distribution device 100 may be, e.g., a power distribution device for a data center, such as a column head cabinet. The power distribution device 100 includes a first power source input end 111, a second power source input end 112, a first power source switch 121, a second power source switch 122, a bus 130 and a load device switch 140. The first power source input end 111 is connected with the first power source for power supply through the first power source, and the second power source input end 112 is connected with the second power source for power supply through the second power source. In the embodiment according to the present disclosure, the first power source may be, e.g., an AC power source and operate as a main power source, and the second power source may be a DC power source and operate as a backup power source. In this situation, the second power source can be especially a hot backup power source, i.e., a power source that can directly supply power, e.g., photovoltaic devices, energy storage batteries, fuel cells, converter power source connected to an AC power grid or a turbine device, etc. Alternatively, the first power source may be, e.g., a DC power source and operate as a main power source, and the second power source may be an AC power source and operate as a backup power source. In this situation, the second power source can be either a cold backup power source, i.e., a power source that needs a start-up process and cannot directly supply power, e.g., a diesel generator and so on, or a hot backup power source. In the embodiment according to the present disclosure, the AC power source may be, e.g., the electric energy input of a high-voltage or medium-voltage AC power grid transformed by a transformer, and the DC power source may include, e.g., a plurality of sub-DC power sources connected in parallel to a DC bus, the sub-DC power sources include photovoltaic devices, energy storage batteries, fuel cells, converter power sources connected to an AC power grid or a turbine device, and the like. For a first power source, a first power source switch 121 is arranged in the power distribution device 100, which connects the first power source input end 111 with the bus 130 and switches on/off the power supply of the first power source through its on and off states. For the second power source, a second power source switch 122 is arranged in the power distribution device 100, which connects the second power source input end with the bus 130 and switches on/off the power supply of the second power source through its on and off states. Only two power sources are exemplarily shown in FIG. 1, and there may be more power sources in the embodiment according to the present disclosure, and more power source switches are arranged accordingly. These power source switches can be, e.g., solid-state switches, mechanical switches or solid-state mechanical hybrid switches. The bus 130 is used for connecting with downstream load devices and distributing electric energy from the first power source and/or the second power source to the load devices, especially a plurality of load devices. In the embodiment according to the present disclosure, the load device may be, e.g., a device suitable for both AC and DC. For example, the load device itself has a power source adapter, which can convert the AC and DC that meet the requirements into DC or AC which is suitable for operating the load device. In the embodiment according to the present disclosure, under the condition that the power distribution device 100 is a power distribution device for a data center, the load device may be, e.g., a network switch, a server or the like. A load device switch 140 is arranged for each load device. The load device switch 140 is used for switching on and off the power supply to the relevant load device. The load device switch may be, e.g., various types of semiconductor switches, and in the embodiment according to the present disclosure, the load device switch 140 may be designed as a thyristor, e.g., thereby reducing the cost of the load device switch.

The traditional mechanical power source switch is not suitable for different types of power sources, especially for DC power sources. In order to adapt to different power source types, in an embodiment according to the present disclosure, the first power source switch 121 and the second power source switch 122 are designed as solid-state switches. Solid-state switches can switch on/off both AC and DC, and can be easily controlled by signals without complicated mechanical driving mechanisms or trigger mechanisms.

Figure 2:
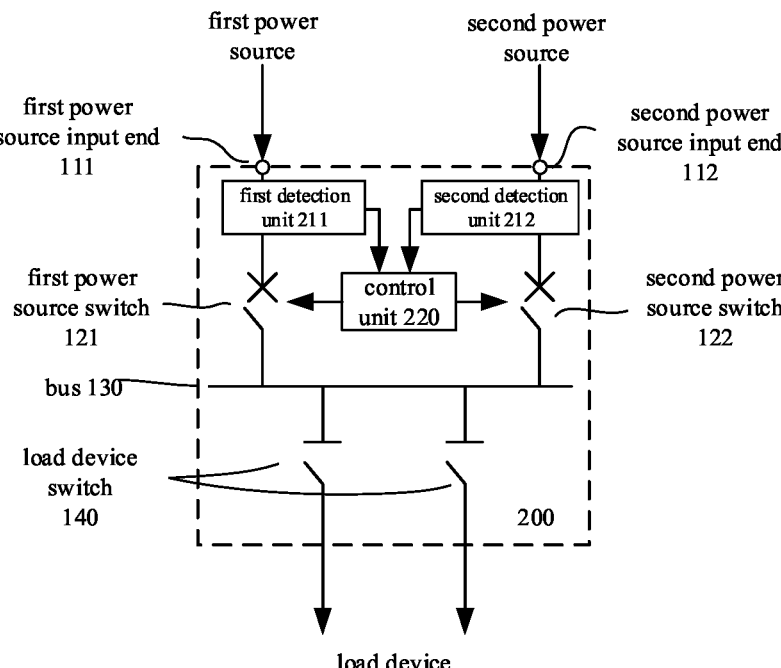
FIG. 2 illustrates a schematic circuit diagram of a power distribution device according to another embodiment of the present disclosure.

FIG. 2 illustrates a schematic circuit diagram of a power distribution device 200 according to another embodiment of the present disclosure. In addition to the elements included in the power distribution device 100 shown in FIG. 1, the power distribution device 200 also includes: a first detection unit 211, a second detection unit 212 and a control unit 220. The first detection unit 211 is used for detecting the electrical parameters of the first power source and the second detection unit 212 is used for detecting the electrical parameters of the second power source, and the first detection unit 211 and the second detection unit 212 are preferably arranged upstream of the first power source switch 121 and the second power source switch 122, respectively. The control unit 220 is used for determining whether the first power source fails according to the electrical parameters of the first power source; and is used for determining whether the second power source fails according to the electrical parameters of the second power source. In the embodiment according to the present disclosure, the electrical parameters may include, e.g., voltage, current and frequency, and derivatives of these parameters. The control unit 220 controls the first power source switch 121 to be switched on, and the control unit 220 controls the first power source switch 121 to be switched off and simultaneously controls the second power source switch 122 to be switched on under the condition that the first power fails. In the embodiment according to the present disclosure, the first power source is used as, e.g., a main power source. Under the condition that the power supply of the first power source is normal, the control unit 220 maintains the first power source switch 121 is switched on. If the control unit 220 determines that the power quality of the first power source is abnormal according to the electrical parameters of the first power source, e.g., loss of voltage, undervoltage, overvoltage or overcurrent, etc., the control unit 220 switches off the first power source switch 121 and switches on the second power source switch 122 at the same time, thereby accessing the second power source as a backup power source to the power distribution device 200. Thereby completing the switching of power sources and ensuring that the power supply is not interrupted. In the embodiment according to the present disclosure, under the condition that there are multiple backup power sources, the control unit 220 can judge whether the power supply of these backup power sources is normal according to the electrical parameters of the relevant backup power sources, and access the backup power sources with the normal power supply to the power distribution device 200. Furthermore, it is also preferable to access the hot backup power source to the power distribution device 200.

Figure 3:
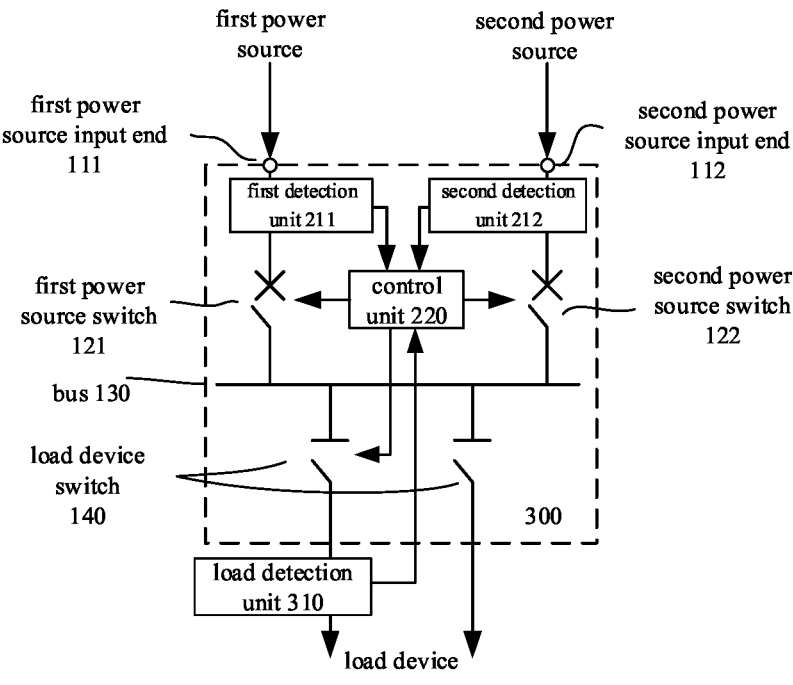
FIG. 3 illustrates a schematic circuit diagram of a power distribution device according to another embodiment of the present disclosure.

FIG. 3 illustrates a schematic circuit diagram of a power distribution device 300 according to another embodiment of the present disclosure. In addition to the elements included in the power distribution device 200 shown in FIG. 2, the power distribution device 300 also includes a load detection unit 310. The load detection unit 310 is used for detecting the electrical parameters of the load device. The control unit 220 determines whether a fault occurs at the load device according to the electrical parameters of the load device, and controls the first power source switch 121 to be switched off first and then switched on under the condition that the load device fails, and controls the load device switch to be switched off in a time period between the switching off and the switching on of the first power source switch 121, or under the condition that the second power source switch 122 is switched on, the control unit 220 controls the second power source switch 122 to be switched off first and then switched on under the condition that the load device fails, and controls the load device switch to be switched off during the time period between the switching off and the switching on of the second power source switch 122. In the embodiment according to the present disclosure, the first power source switch 121 and the second power source switch 122 can be quickly switched on/off, e.g., designed as fast on-off switches, and the on-time and off-time of the fast on-off switches can be less than 10 ms, preferably less than 5 ms. In the embodiment according to the present disclosure, the first power source switch 121 and the second power source switch 122 are designed as solid-state switches, and the load device switch 140 is designed as a thyristor. In case of a fault in the load equipment, e.g., short-circuit or leakage, the solid-state switch will be switched off before the thyristor based on a faster action time. This situation does not meet the requirements of selective protection. The switching off of the solid-state switch, i.e., the switching off of the first power source switch 121 or the second power source switch 122 that is supplying power, will cause all the load devices on the bus 130 to be switched off. In this situation, after the first power source switch 121 or the second power source switch 122 is switched off, the control unit 220 determines whether a fault occurs at the load device according to the electrical parameters of the relevant load device, and switches off the load device switch 140 on the line of the failed load device, thereby excluding the short circuit danger of the load device. After the relevant load device switch 140 is switched off, the first power source switch 121 or the second power source switch 122 is switched on and the power supply of the first power source or the second power source is restored. The switching-off and subsequent switching-on of the first power source switch 121 or the second power source switch 122 are carried out as quickly as possible, thereby reducing the influence on other normally operating load devices as much as possible.

The power distribution device according to the embodiments of the present disclosure can be compatible with AC power source and DC power source, thus the power distribution device can adapt to the diversification of current power source types. Compared with the traditional power distribution cabinet or column head cabinet, automatic transfer switch (ATS) or static transfer switch (STS) for switching power sources is omitted in the power distribution device according to the present disclosure, thereby the volume of the power distribution device can be reduced. Furthermore, the power distribution device based on solid-state switch can realize switching between power supplies more efficiently and quickly, and has lower power consumption. The power distribution device based on solid-state switches thus has higher integration and thus can have smaller volume.

Figure 4:
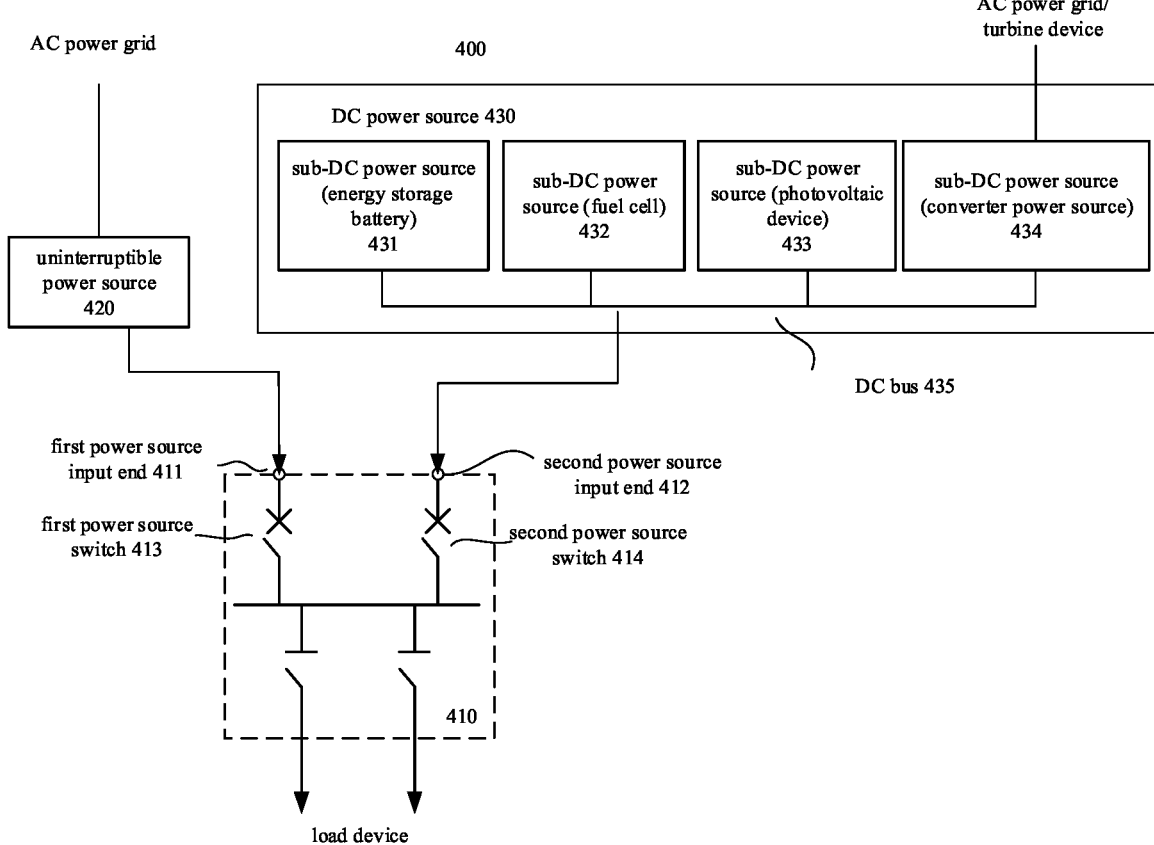
FIG. 4 illustrates a schematic circuit diagram of a power distribution system according to an embodiment of the present disclosure.

FIG. 4 illustrates a schematic circuit diagram of a power distribution system 400 according to an embodiment of the present disclosure. As shown in FIG. 4, the power distribution system 400 includes: a power distribution device 410, an uninterruptible power source 420 and a DC power source 430. The power distribution device 410 may be designed according to the above-described embodiment regarding the power distribution device. An AC power grid is first connected to the uninterruptible power source 420, and then the uninterruptible power source 420 is connected to the first power source input end 411 of the power distribution device 410. Uninterruptible power source 420, i.e., UPS, on the one hand can continue to supply power to the downstream load device for a short time (for example, for 15 minutes) when the upstream AC power grid is switched off, and on the other hand, it can eliminate power pollution like surge, transient high/low voltage and frequency offset in the upstream AC power grid, and thereby improving power quality. In addition to the uninterruptible power source 420, there is another DC power source 430 to supply power to the load device. The DC power source 430 is connected to the second power source input end 412 of the power distribution device 410. The DC power source 430 includes a plurality of sub-DC power sources 431, 432, 433 and 434 connected in parallel to a DC bus 435. In an embodiment according to the present disclosure, the sub-DC power source includes photovoltaic devices, energy storage batteries, fuel cells, converter power sources connected to an AC power grid, and the like. These sub-DC power sources 431, 432, 433 and 434 operate in coordination or alternately based on their respective preset bus voltage change curves or contribute power change curves. Based on the fusion of multiple sub-DC power sources and the fast adjustment characteristics of related power distribution device, the DC power source 430 naturally has certain uninterrupted characteristics, thereby there is no need for additional uninterrupted power source. In the embodiment according to the present disclosure, these sub-DC power sources 431, 432, 433 and 434 can exist in a distributed manner, i.e., each sub-DC power source can be closed to each row/column of load devices in groups, for example the IT load device of the data center is spatially arranged in rows/columns, thereby high energy absorption can be achieved and failure risks can be dispersed.

Because the imbalance between the real-time power source capacity of the DC power source 430 and the real-time load of the load device is embodied in the voltage fluctuation on the DC bus 431 of the DC power source 430, in an embodiment according to the present disclosure, it is stipulated that under the condition that the voltage on the DC bus 435 of the DC power source 430 is higher than the preset switching threshold, the second power source switch 414 of the power distribution device 410 is switched on, thereby the power is supplied through the DC power source 430, and under the condition that the voltage on the DC bus 435 of the DC power source 430 is lower than the preset switching threshold, the second power source switch 414 is switched off and the first power source switch 413 is switched on, thereby the power can be supplied through the uninterruptible power supply 420. In this way, the most direct DC power management can be realized. In the embodiment according to the present disclosure, under the condition that the voltage on the DC bus 435 of the DC power source 430 is higher than the preset switching threshold and maintains stable, the second power source switch 414 of the power distribution device 410 is switched on. For example, under the condition that the voltage on the DC bus 435 of the DC power source 430 is higher than the preset switching threshold, it is additionally stipulated that the voltage on the DC bus 435 is stable in a predefined interval on the one hand, and maintains stable for a predefined duration on the other hand.

Figure 5:
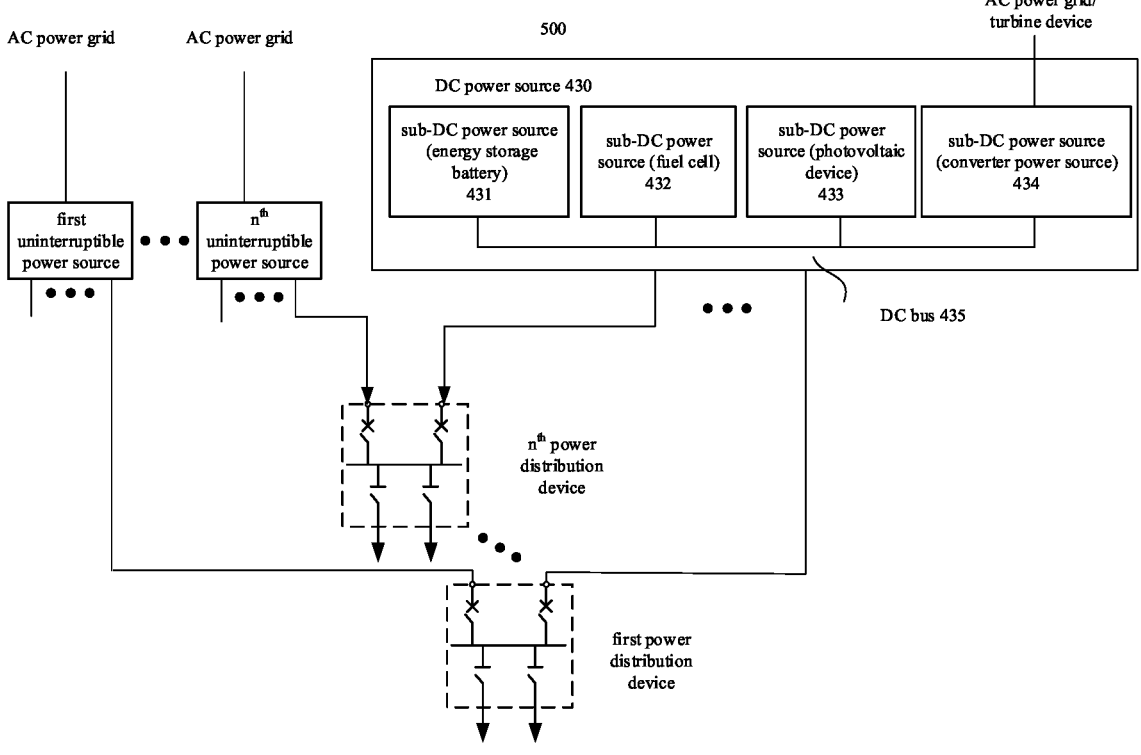
FIG. 5 illustrates a schematic circuit diagram of a power distribution system according to another embodiment of the present disclosure.

FIG. 5 illustrates a schematic circuit diagram of a power distribution system 500 according to another embodiment of the present disclosure. Similar to the power distribution system 400 with only one power distribution device shown in FIG. 4, n power distribution devices are exemplarily shown in FIG. 5, i.e., from the first power distribution device, the second power distribution device . . . the $n^{th}$ power distribution device. On the one hand, these power distribution devices can be connected with the same uninterruptible power source, for example with the first uninterruptible power source, or can be connected with different uninterruptible power sources respectively, for example with the first uninterruptible power source, the second uninterruptible power source . . . the $n^{th}$ uninterruptible power source. On the other hand, these power distribution devices can also be connected to the DC power source 430 respectively. In the embodiment according to the present disclosure, under the condition that there is a plurality of power distribution devices, different switching thresholds are preset respectively for the power distribution devices, and wherein under the condition that the voltage on the DC bus 435 of the DC power source 430 is higher than the relevant switching threshold, the second power source switch of the relevant power distribution device is switched on. For example, the first power distribution device, the second power distribution device . . . the $n^{th}$ power distribution device has the first switching threshold, the second switching threshold . . . the $n^{th}$ switching threshold respectively, and the first switching threshold is smaller than the second switching threshold . . . smaller than the $n^{th}$ switching threshold. Under the condition that the voltage on the DC bus 435 of the DC power source 430 rises and is higher than the first switching threshold, the second power source switch of the first power distribution device is switched on; as the voltage on the DC bus 435 of the DC power source 430 gradually rises, the second power source switches of the second power distribution device . . . the $n^{th}$ power distribution device are switched on in turn, thereby more and more power distribution device are connected to the DC power source 430. Conversely, under the condition that the voltage on the DC bus 435 of the DC power source 430 drops, more and more power distribution devices are switched off from the DC power source 430. This orderly switching of the power distribution device can realize adjusting the number of relevantly accessed power distribution devices and the number of downstream load device according to the random real-time capacity of DC power source 430, thereby the maximum utilization of the DC power source 430 can be realized.

The power distribution device and power distribution system according to the embodiments of the present disclosure can be compatible with AC power source and DC power source, thus the power distribution device can adapt to the diversification of current power source types, thus can realize the most direct green absorption of selected loads, thereby realizing the maximum utilization of green energy within the data center and simultaneously guaranteeing high-reliability power supply. Compared with the traditional power distribution cabinet or column head cabinet, automatic transfer switch (ATS) or static transfer switch (STS) for switching power source is omitted in the power distribution device according to the present disclosure, thereby the volume of the power distribution device can be reduced. Furthermore, the power distribution device based on solid-state switches can realize switching, protection and measurement between power sources more efficiently and quickly, and has lower power consumption. The power distribution device based on solid-state switches thus has higher integration and thus can have smaller volume.

The block diagrams of circuits, units, equipment, apparatus, devices and systems involved in the present disclosure are only exemplary examples, and are not intended to require or imply that they must be connected, arranged and configured in the manner shown in the block diagram. As those skilled in the art will recognize, these circuits, units, equipment, apparatus, devices and systems can be connected, arranged and configured in any way, as long as the desired purpose can be achieved. The circuits, units, equipment and apparatus involved in the present disclosure can be implemented in any suitable way.

It should be understood by those skilled in the art that the above specific embodiments are only examples rather than limitations, and various modifications, combinations, partial combinations and substitutions can be made to the embodiments of the present disclosure according to design requirements and other factors, as long as they are within the scope of the appended claims or their equivalents, i.e., they belong to the scope of claims to be protected by the present disclosure.

What is claimed is:

1. A power distribution device comprising:
a first power source input end, which is configured to connect a first power source,
a second power source input end, which is configured to connect a second power source,
a first power source switch, which is configured to connect the first power source input end with a bus and switch on and off the power supply of the first power source,
a second power source switch, which is configured to connect a second power source input end with the bus and switching switch on and off the power supply of the second power source,
the bus, which is configured to connect with a load device and supply power for the load device, and
a load device switch, which is configured to switch on and off the power supply to the load device, wherein the power distribution device further comprises:
a load detection unit, which is configured to detect the electrical parameters of the load device,
a control unit, which is configured to determine whether a fault occurs at the load device according to the electrical parameters of the load device,
wherein in response to the switching on of the first power source switch, the control unit is configured to control the first power source switch to be switched off first and then switched on in response to the failure of the load device, and control the load device switch to be switched off in a time period between the switching off and the switching on of the first power source switch, or
in response to the switching on of the second power source switch, the control unit is configured to control the second power source switch to be switched off first and then switched on in response to a failure of the load device, and control the load device switch to be switched off in a time period between the switching off and the switching on of the second power source switch.

2. The power distribution device according to claim 1, wherein the power distribution device further comprises:
a first detection unit, which is configured to detect the electrical parameters of the first power source,
a second detection unit, which is configured to detect the electrical parameters of the second power source, and
wherein the control unit is configured to determine whether the first power source fails according to the electrical parameters of the first power source and to determine whether the second power source fails according to the electrical parameters of the second power source,
wherein the control unit is configured to control the first power source switch to be switched on, and in response to a failure of the first power source, the control unit is configured to control the first power source switch to be switched off and simultaneously control the second power source switch to be switched on.

3. The power distribution device according to claim 1, wherein the first power source is an AC power source and is configured as a main power source, the second power source is a DC power source and operates as a backup power source, or the first power source is a DC power source and is configured as a main power source, and the second power source is an AC power source and operates as a backup power source.

4. The power distribution device according to claim 3, wherein the DC power source comprises a plurality of sub-DC power sources connected in parallel to a DC bus, and the sub-DC power source comprises photovoltaic devices, energy storage batteries, fuel cells, and converter power sources connected to an AC power grid or a turbine device.

5. The power distribution device according to claim 1, wherein the first power source switch and the second power source switch are mechanical switches, whose switch-on time and switch-off time are both less than 10 ms.

6. The power distribution device according to claim 1, wherein the first power source switch and the second power source switch are solid-state switches, and the load device switch is a thyristor, and a switch-off time of the solid-state switches is less than a switch-off time of the thyristor.

7. The power distribution device according to claim 1, wherein the electrical parameters comprise voltage, current and frequency.

8. A power distribution system comprising:

a first power distribution device, which is configured as the power distribution device according to claim 1, a first uninterruptible power source, which is configured to connect to the first power source input end of the first power distribution device, a DC power source, which is configured to connect to the second power source input end of the first power distribution device and comprises a plurality of sub-DC power sources connected in parallel to a DC bus, wherein the control unit of first power distribution device is configured to assign a first switching threshold to the first power distribution device and control the second power source switch of the first power distribution device to be switched on in response to the voltage on the DC bus being greater than the first switching threshold.

9. The power distribution system according to claim 8, further comprising:

a second power distribution device, which is configured as the power distribution device according to claim 1, a second uninterruptible power source, which is configured to connect to the first power source input end of the second power distribution device, wherein the DC power source is further configured to connect to the second power source input end of the second power distribution device, wherein the control unit of the second power distribution device is configured to assign a second switching threshold, which is less than the first switching threshold, to the second power distribution device and control the second power source switch of the second power distribution device to be switched on in response to the voltage on the DC bus being greater than the second switching threshold.

* * * * *